United States Patent Office 3,713,003
Patented Jan. 23, 1973

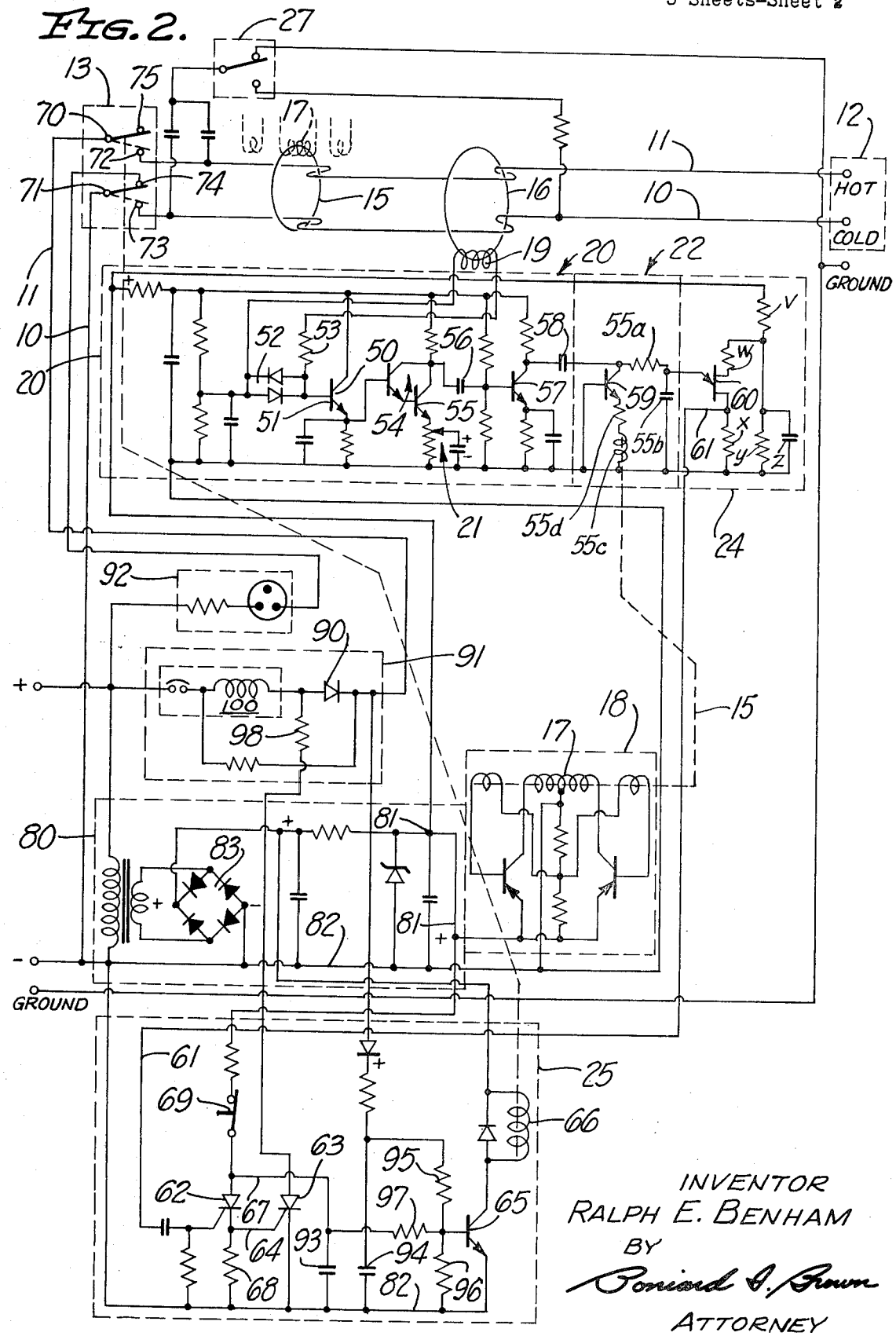

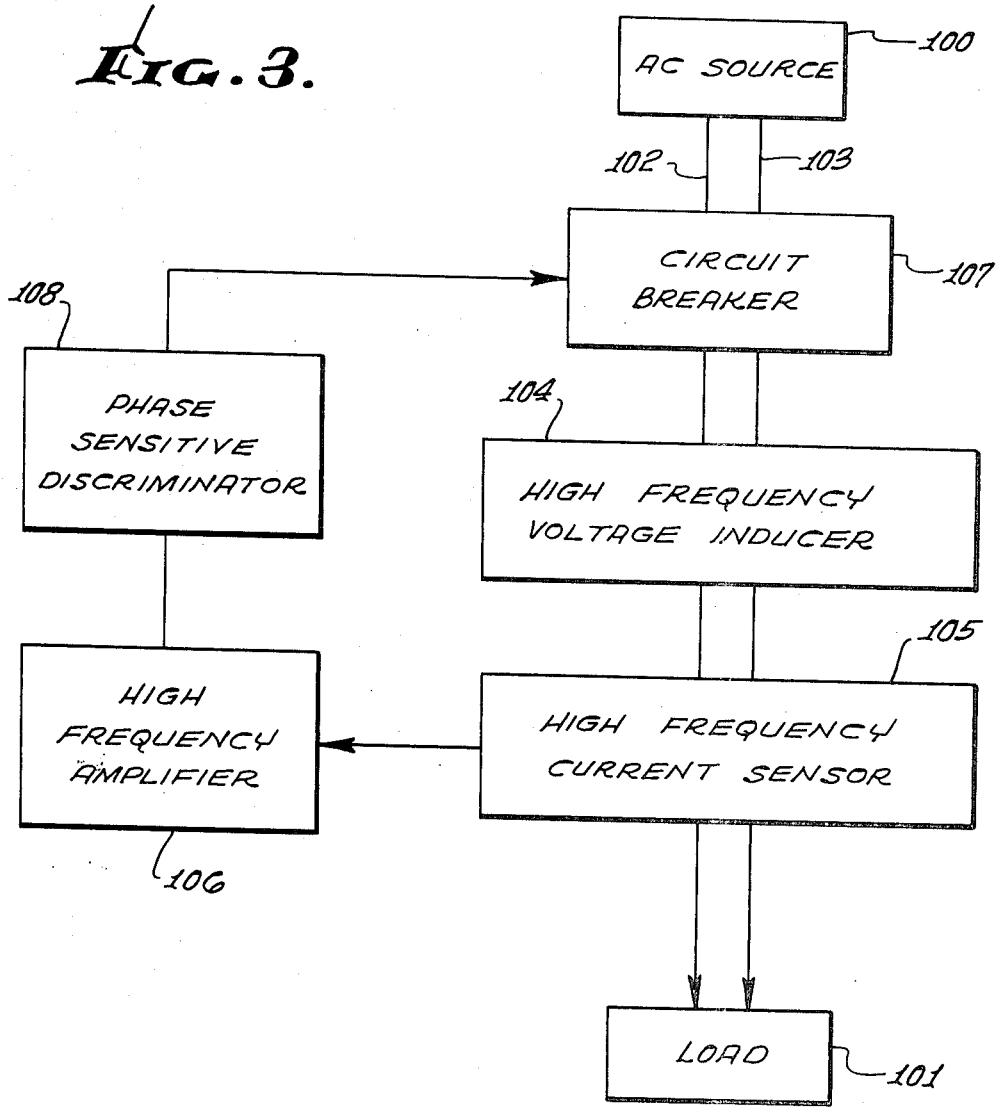

3,713,003
FAULT OR LEAK DETECTOR
Ralph E. Benham, Arcadia, Calif., assignor to Purex Corporation, Ltd., Lakewood, Calif.
Continuation-in-part of application Ser. No. 856,095, Sept. 8, 1969. This application Feb. 16, 1971, Ser. No. 115,252
Int. Cl. H02h 3/16
U.S. Cl. 317—18 D
16 Claims

ABSTRACT OF THE DISCLOSURE

A fault detector for an A.C. circuit including an oscillator inductively coupled to the A.C. lines to impress a signal voltage relatively high in frequency and relatively much lower in voltage thereon and a sense circuit responsive to high frequency current in the line. This current only flows when a leak or fault from the line to earth is present. The resulting sense circuit signal is amplified and passed through a phase sensing circuit to eliminate stray fault readings and used to trip a circuit interrupter to disconnect the load from A.C. power.

REFERENCE TO RELATED APPLICATION

This application is a continuation-in-part of my copending application Ser. No. 856,095, now abandoned, filed Sept. 8, 1969 and entitled, "Fault or Leak Detector."

BACKGROUND OF THE INVENTION

This invention has to do with fault detecting devices and fault protected A.C. circuits. Specifically the invention provides a novel apparatus for protecting A.C. circuits against leakage and faults.

In a typical A.C. circuit comprising an A.C. power source, power lines and a load to be operated by the power, leakages may occur to ground through failure of line insulation or breakage of the load device e.g. a swimming pool subsurface lamp. The danger to humans is great as the A.C. voltage may be grounded through a person with deadly effect.

PRIOR ART

In my prior patent U.S. Pat. 3,407,337, issued Oct. 22, 1968, there is disclosed a highly effective leak detector and protective device which operating through a differential transformer generates in a secondary winding an output in response to an imbalance in the two A.C. power lines forming the primary windings of the transformer. The current imbalance is the result of leakage or a fault. The output generated is used to operate an interrupter such as a circuit breaker.

Other specifically different devices intended for similar uses have been known. See U.S. Pat. 3,286,129 to Gagniere, U.S. Pat. 3,019,373 to Kramer, U.S. Pat. 3,467,890 to Mayer, U.S. Pat. 3,213,321 to Dalziel, U.S. Pat. 3,202,875 to Bateman, U.S. Pat. 3,214,638 to Moser and U.S. Pat. 3,243,658 to Blackburn.

SUMMARY OF THE INVENTION

The present invention provides a fault or leak detector which operates by continuously impressing a signal voltage on the A.C. lines and detecting a signal in response to a leak or fault condition in the lines.

It is a major objective of the invention to reduce or eliminate post-fault detection current flow through more rapid circuit interruption, to prevent incipient sparking, melting of insulation and fire, and possible electrocution of persons by detection of a pre-existing signal condition on the A.C. lines rather than generating a signal initially at the occurrence of the fault or leakage. It is a further objective to provide a fault detector of greatly increased sensitivity so that hitherto undetected leakages may be discovered and corrected before fatal contact of a person with the circuit.

In this invention, an oscillator is provided to produce continuously a characteristic voltage signal to be applied to the A.C. lines in such fashion that the oscillator output under normal conditions is not detected.

A faulted line causes conditions leading to an output signal indicative of the faulted line. The faulted line signal operates a line interrupting switching means. A test means is provided which simulates the fault condition to trip the line opening relay or other switch.

Thus, the present invention provides a means to cut-off power to a load in an A.C. power line when leakage or a short develops between one of the phases (lines) of the power line and ground.

It is a further object of this invention to accomplish the cut-off of a power line from a load when a fault or other leakage impedance develops between one of the lines of the power line and ground by applying a characteristic signal to the power line and detecting the signal in response to the fault condition.

BRIEF DESCRIPTION OF THE DRAWINGS

FIG. 2 is a schematic circuit diagram of one form of implementation of the invention;

FIG. 3 is a highly simplified block diagram of the invention circuit.

DESCRIPTION OF THE PREFERRED EMBODIMENTS

Figure 1:
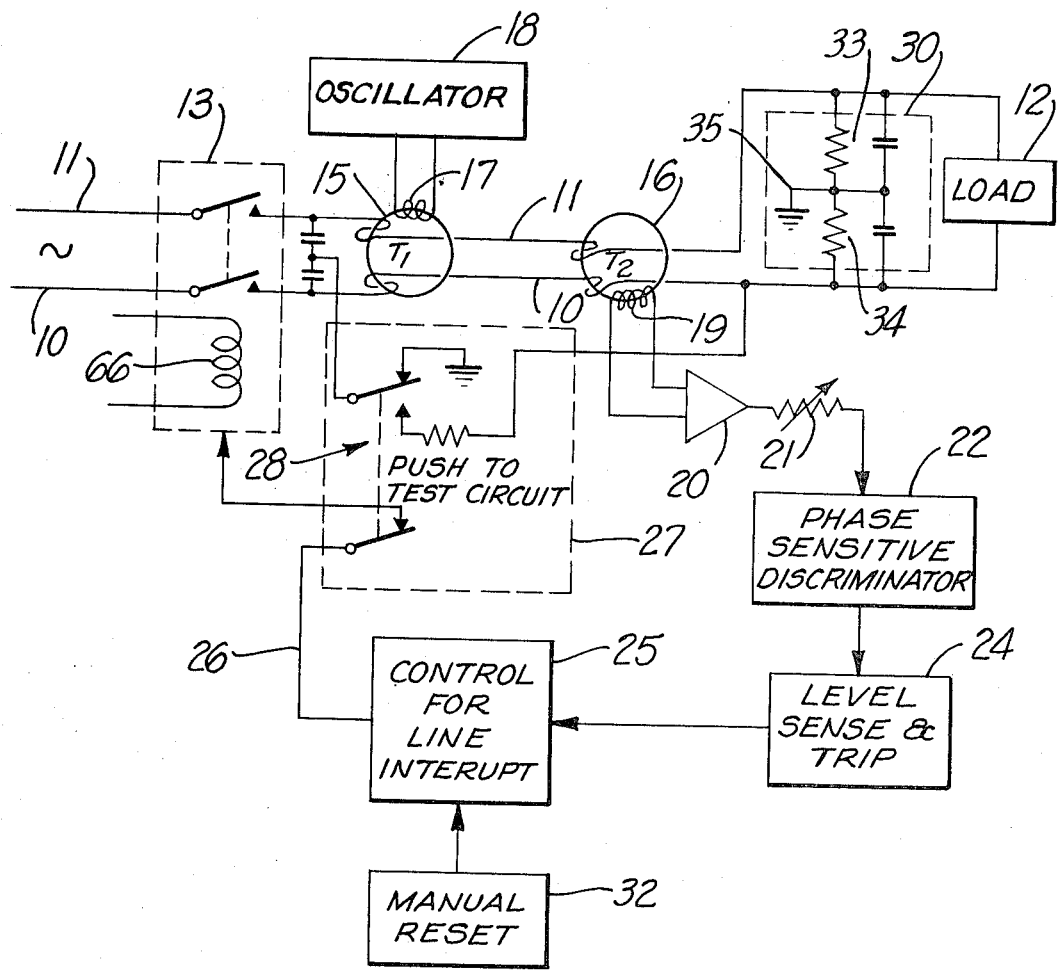
FIG. 1 is a schematic and block diagram of a circuit according to this invention.

With reference first to FIG. 3, the present invention provides a fault detector for an A.C. circuit comprising an A.C. source 100, a load 101 and A.C. power lines 102, 103. An oscillator 104, operating as a high frequency voltage inducer is inductively coupled across both line 102 and 103 for the purpose of impressing a low voltage, e.g. as little as 1 volt, high frequency (relative to the A.C. frequency) signal on both lines. A sensing circuit shown as high frequency current sensor 105 and comprising a differential transformer having the respective A.C. lines 102 and 103 as primary windings and as secondary output winding monitors the high frequency current in lines 102 and 103. When the load is operating normally and no other leakage occurs from the lines the oscillator signal impressed on lines 102 and 103 cannot cause a high frequency current to flow and thus there is no output in the sensor 105 secondary winding. Upon the occurrence of a fault, a high frequency current flows in the lines which are the sensor 105 primary windings, which causes a high frequency signal to be induced into the sensor secondary. The sensor 105 secondary winding puts out this induced voltage signal to amplifier 106. The amplified signal is passed through a phase sensitive discriminating circuit 108 where stray signals resulting from the high frequency current passing through the normal line to earth capacitance is discriminated so that only resistive leakage produced by a fault is passed to the circuit interrupting means such as circuit breaker 107. Upon receiving the amplified signal the circuit breaker 107 opens the circuit and disconnects the load 101 from the A.C. power source 100.

With reference to FIG. 1, a power line pair 10, 11 is applied to a load 12 through a circuit breaker or line interrupter 13. The lines 10, 11 pass through inductive coupler 15 and a differential transformer 16. Coupler 15 has a secondary winding 17 connected to an oscillator 18 which is continuously operated by means not shown to impress a low voltage high frequency signal on the line A.C.; transformer 16 has a secondary winding 19 connected to an amplifier 20. Amplifier 20 has an attenuation device as represented at 21. With reference to secondary windings 17 and 19, coupler 15 and transformer 16 operate respectively as an inductive coupler between lines 10, 11 and oscillator 18 and a transformer receiver for high-frequency signals impressed by oscillator 18.

Attenuation device 21 may be connected either at the input to amplifier 20 (not shown) or to the output of amplifier 20 as shown. The output of amplifier 20 is connected to a phase sensitive discriminator 22. The output of discriminator 22 is connected to a level sensing and trip signal circuit identified as block 24 which in turn is connected to a control circuit 25 for tripping the line interrupter 13. The test circuit 27 includes a push button means 28 for producing a simulated ground leakage condition to operate the fault sensing circuit hereinabove described.

Within dashed block 30 there is a pair of representative R-C potential leakage paths 34, 33 relative to the oscillator output from line 10 and 11 each to ground 35. These will be more fully discussed below.

Manual reset 32 is provided in the line interrupt control 25 to return the line connection to the load after the fault has been identified and corrected.

In FIG. 2, a complete circuit schematic diagram of the system is illustrated and gives details of the items in the several blocks shown in FIG. 1. The blocks of FIG. 2 corresponding to those in FIG. 1 are represented by dashed-in blocks in FIG. 2 bearing the same reference characters as those in FIG. 1.

The items not previously explained are explained hereinbelow:

The amplifier 20 consists of an emitter follower input stage 50 coupled by its base 51 to input winding 19 from sensing differential current transformer 16. A pair of diodes 52 and resistor 53 will limit the signals of excessive amplitude from transformer winding 19 to some predetermined value to prevent overloading of the amplifier 20. The Darlington pair 54 amplifies the output of the emitter follower 50, applying the output thereof through capacitor 56 to a grounded emitter output amplifier 57. The output across capacitor 58 is applied to phase discriminator (block 22). Discriminator block 22 includes a transistor 59 with a winding 55c and limiting resistor 55d in series between the emitter of the transistor 59 and the ground. Winding 55c is on the same toroidol core 15 as coupler secondary winding 17. This is shown by the dashed line also identified as 15, extending through windings 55c and 17 in dashed block 18.

A high-frequency signal from oscillator 18 is thereby coupled from coupler secondary winding 17 to winding 55c to act as a phase reference signal for the discriminator 22.

Signals from amplifier 20 applied to the collector of discriminator transistor 59 are also applied to capacitor 55b via resistor 55a.

Transistor 59 will be conducting when the phase of the signal in winding 55c with reference to the phase of the signal applied to the collector of transistor 59 is such that the collector is positive with respect to the emitter thereof. It will be non-conductive when the phase of its two signals, winding 55c and collector of transistor 50 is such that the collector is negative with respect to the emitter. When the relative phases between the signals on collector and emitter of transistor 59 are between these two extremes, a charge is developed on capacitor 55b, proportional to the product of the phase difference between them and the amplitude of the signal from amplifier 20 on the collector of transistor 59. Thus capacitive leakage characteristic of A.C. circuits is distinguished from resistive leakage needed to be corrected.

The phase-difference product signal output from the collector of transistor 59 comprising the resistive leakage caused signal is applied via current-limiting resistor 55a to the unijunction transistor 60 which becomes conductive when the amplitude of the phase-difference product signal charge on capacitor 55b exceeds a predetermined trip level of the unijunction transistor 60 established by the resistor and capacitor network identified as V, W, X, Y, Z. This creates an impulse on line 61 which causes SCR 62 to become conductive.

When SCR control device 62 becomes conductive, a D.C. potential develops across resistor 68 in series therewith which is applied by lead 64 to the gate of SCR (Silicon Controlled Rectifier) 63 to render SCR 63 conductive, which in turn forces an unusually high current through circuit breaker 100 opening it. It should be noted that relay contacts 70–75 and breaker 100 are represented by block 13 in FIG. 1.

At the same time that SCR 62 becomes conductive, the point shown as line 67 and heretofore deriving the full-positive potential with respect to ground from point 81 of diode bridge 83 in block 80, now becomes nearly shorted to ground across resistor 68 through the now conducting SCR diode 62. This changes the biasing conditions on the base of transistor relay amplifier 65 to de-energize relay coil 66.

The normal condition of transistor relay amplifier 65 is conductive so that relay 66 is energized and contacts 71, 73 are closed and 70, 72 are closed also. This puts the A.C. line current through inductive coupler 15 and differential transformer 16 to the load 12.

Should there be a failure in any event, such as, for example loss of power by a break in the line or the like, the relay 66 will be de-energized and open contacts 70, 72 and 71, 73 taking the power from the load.

Relay amplifier transistor 65 is normally conductive with relay coil 66 energized, so that the condition of operation of the contacts 70, 71 in box 13 is as shown in dashed line to terminals 72, 73 (closed position) and power is applied to the load device connected at 12. When SCR 62 is triggered as above described, the bias on transistor relay amplifier 65 is removed and the contacts 70, 71 open to the solid-line position 74, 75 shown in box 13. But, prior to the opening of contacts 70, 72 and 71, 73, circuit breaker 100 will be tripped as previously described. Circuit breaker 100 can only be reset manually after the reset button 69 has been operated as described below.

Reset button 69 when operated momentarily will open lead 67 to de-energize SCR 62, placing the circuit in the normal operating condition. In this condition, relay control 65 is again conducting. Thus, it may be seen that once a fault has occurred, one cannot restart the system before correcting it.

Oscillator 18 may be a conventional push-pull oscillator of the type normally used in D.C. to A.C. inverters.

D.C. potential for the operation of the transistor amplifier, oscillator and triggering circuits is provided by a bridge rectifier power supply as in block 80.

A circuit breaker assembly 100 is provided as shown at block 91 in series with one leg (the hot leg) 11 of the power line.

A neon fault indicator 92 is connected between the hot side (11) of the power line and terminal 74 (on the cold side) of the A.C. line 10 so that when relay coil 66 is de-energized in the presence of a fault signal received in winding 19, neon indicator 92 will light up.

The impedances shown in block 30 of FIG. 1 present a representative line impedance condition to ground related to a fault in the 60-cycle 110-volt current. At the frequency of oscillator 18, the resistive component of the simulated line impedance network (30) is the same while the reactive (capacitive) component of the impedance is very much smaller (that is, it has a lower value at the high-frequency of the oscillator than at 60 cycles per second).

Thus, when there is a fault between line 11 and ground, there wil be an effective change in the impedance of R-C element 33 as seen by the oscillator 18 so that the current flowing at the high-frequency in line 11 is greater than normal. An increased output from secondary winding 19 results which in turn increases the signal on the collector of transistor 59 to trip the relay 66 as previously described. The assumed fault condition occurring on line 10 will result in the same action.

In the event that an open circuit develops in "cold" side of the line at a point preceding the protective device of this invention, the "cold" side of the line beyond the present apparatus will now have 110 volts or 60 cycles on it through the load.

Should there be no detector-interrupter, the danger of electrocuting or severely shocking one coming in contact with this "cold" side of the line and ground is great; but the device of this invention precludes such a possibility because its operation is dependent on A.C. power being applied. Removal of A.C. power by opening either hot or cold lines prior to device causes relay 13 to open thus, disconnecting the line from the load.

Any industrial, hospital or other area in which there are potential explosion hazards from a spark will be protected by the device described herein because any fault removes the power and the power cannot be reapplied without first correcting the fault.

There has been described apparatus for opening the circuits of an A.C. circuit in the presence of a faulty condition in either side of the line. The presence of the high-frequency signal in the lines makes it possible to generate a fault signal whenever a resistance between either conductor and ground exists.

The fault may be simulated for test of the system by the use of a push-button test device.

The fault indication is the disconnect of the power from the load with a visual indication that this has occurred. While a neon indicator 92 has been shown, any form of indicator to suit the purpose can be used.

The differential transformer, so long as there is no fault or leak to earth on the load side of the detector, does not couple energy from oscillator winding 17 to pickup winding 19. The instant there is a fault or leak, the oscillator signal from oscillator 18 is transferred to pickup winding 19 and thence to the amplifier and gate signal generator 20, 22, 24. The gating of SCR's 62, 63 occur to trip the circuit-breaking action.

While the invention has been disclosed in connection with certain of its physical embodiments, various modifications of the invention are possible within the spirit and scope of the following claims.

I claim:

1. A fault detector and circuit breaker for electric power line circuits for removing power from a load connected to the A.C. power line in the presence of a fault, said circuit comprising:
   an inductive coupler having as primary windings, the A.C. power line therethrough, said power line windings being oriented so that the fields thereof are normally cancelled, and a secondary winding independent of said primary windings;
   a differential transformer, having said A.C. power lines as primary windings and a secondary winding, having no coupling to said primary windings except in response to fault between earth and said primary windings;
   an oscillator having an output circuit coupled to said coupler secondary winding;
   an amplifier having an input circuit coupled to said secondary winding of said differential transformer and also having an output circuit, the output circuit of said oscillator being coupled to the input circuit of said amplifier via the respective secondary windings of said coupler and differential transformer when a high frequency current flows in the A.C. power line windings in said coupler and differential transformer in response to a fault to earth;
   a gate signal generator having an input circuit coupled to said output circuit of said amplifier and having an output circuit in which a gate signal is developed in response to an oscillator signal being present in said amplifier;
   a gated rectifier circuit, having a gate circuit coupled to the output circuit of said gate signal generator and being responsive to said gate signal to become conductive; and
   a relay control circuit having a normally conductive biasing circuit therein coupled to said gated rectifier circuit, and a relay normally energized thereby so as to connect said A.C. power line through said coupler and differential transformer to the load, said relay control circuit being responsive to said gated rectifier circuit, to become non-conductive to de-energize said relay and disconnect said A.C. power line from the load, whereby a fault in said A.C. power line circuit due to conditions in either the line or the load which cause a difference in the current in the respective lines through said differential transformer will cause the breaking of the power line circuit from the load to prevent damage to the load, or the line, or injury to personnel who may come in contact with either the load or the environment in which the load exists.

2. The fault detector defined in claim 1 wherein the gated rectifier device is a series connected silicon controlled rectifier network.

3. The fault detector defined in claim 1 wherein the A.C. power lines coupled through said differential transformers include a capacitive sensing circuit and a switch for simulating a fault condition in order to test the operation of the fault detector.

4. A fault detector including A.C. power lines leading from an A.C. source, said detector comprising:
   an oscillator adapted to impress low voltage relatively high frequency signal energy on said power lines;
   an amplifier and gate signal generator adapted to be responsive to signal energy from said oscillator to develop a gating signal;
   differential transformer means interconnected between said source of signal energy and said amplifier and having therethrough the pair of A.C. power lines arranged so as to normally prevent transfer of signal energy from said source to said amplifier and to enable the transfer of said signal energy to said amplifier when a fault occurs between said lines and a ground or reference potential point; and
   a gated relay control means being coupled to said amplifier and gate signal generator and having contacts in said power lines, said relay control means being normally energized to connect said power lines to utilization load devices and circuits through said contacts, said gated relay control means being adapted to be responsive to said gating signal to become de-energized and thereby open said contacts to disconnect said power lines from said utilization load devices.

5. The fault detector defined in claim 4 wherein said gate signal generator is a unijunction transistor.

6. The fault detector defined in claim 4 wherein said gated relay control means includes a silicon controlled rectifier and a transistor having a relay in the collector circuit thereof, the transistor being responsive to said silicon controlled rectifier when conducting to be non-conductive and when said silicon controlled rectifier is non-conductive said transistor is conductive.

7. A fault detector for A.C. power lines leading from an A.C. source, said detector comprising
   differential transformer means coupled to said power lines;
   an oscillator having a relatively high frequency signal output coupled to said power lines between said A.C. source and said differential transformer means;
   a gate signal generator means coupled to said differential transformer means and responsive to said oscillator signal to develop a gate signal in response to a predetermined condition of said differential transformer means;

silicon controlled rectifier means coupled to said gate signal generator and adapted to respond to said gate signal to become conductive; and relay means coupled to said silicon controlled rectifier means and having a switch means connected thereto, responsive to said silicon controlled rectifier to be normally closed so long as said rectifier means is nonconductive and to be open when said silicon controlled rectifier means is conductive;

whereby when the A.C. power lines are connected through said switch means and said differential transformer means to load devices and circuits, the condition of said differential transformer means will change when there is a high frequency current flow in said A.C. lines due to leakages to ground in said lines or said load devices and circuits, the changed condition of said differential transformer resulting in the development of the gate signal to de-energize said relay means and open said contacts.

8. The fault detector defined in claim 7 including an inductive coupler and a differential transformer with a pair of power lines serially therethrough, said oscillator being coupled to said coupler and said gate signal generator means being coupled to the said differential transformer, there being normally no transfer of signal between said oscillator and said gate signal generator so long as said pair of power lines are free of faults to ground.

9. In a fault detector system including A.C. power lines leading from an A.C. source:

an oscillator continuously generating a relatively high frequency signal;

differential transformer means;

means for coupling said signal through said power lines to said differential transformer, said differential transformer means being adapted to normally prevent the transfer of said signal so long as the power lines are free of faults to ground; and said means for utilizing said signal being adapted to disconnect said power lines from loads when a fault occurs.

10. A protective system including A.C. power lines leading from an A.C. source said system comprising a fault detector inductively coupled to said power lines, said detector including:

a differential transformer;

a relay circuit having contacts adapted for interrupting current flow in said power lines, said lines being connected through said contacts and said differential transformer to load circuits;

a relatively high frequency signal generator inductively coupled to said power lines;

a sensing circuit being responsive to said signal generator for developing a trip signal, said sensing circuit being coupled to said differential transformer; and a trip circuit connected between said sensing circuit and said relay circuit, and responsive to said trip signal to open said contacts to interrupt said power lines, disconnecting them from said load circuits when either of said power lines through said transformer have faults to ground.

11. A fault detector for an A.C. circuit including an A.C. source, said detector comprising means to continuously impress a low voltage, high frequency signal on both power lines leading from said source to the load between the source and the load and sense circuit means between the signal impressing means and said load to detect said signal voltage responsive to a high frequency current flow in said lines.

12. The fault detector according to claim 11 in which the signal impressing means comprises an oscillator inductively coupled to said A.C. lines.

13. The fault detector according to claim 11 in which the sense circuit means includes a differential transformer having a secondary winding providing an output signal corresponding to the impressed signal in response to high frequency current flow in the primary windings of the transformer.

14. The fault detector according to claim 13 in which said detecting means includes signal amplifying means and phase discrimination means adapted to prevent stray signal leakage causing interruption of said power lines.

15. The fault detector according to claim 14 including also circuit interrupting means adapted to disconnect the load in response to signal detection by the detecting means.

16. The fault detector according to claim 15 in which the signal impressing means comprises an oscillator inductively coupled to said A.C. lines.

References Cited

UNITED STATES PATENTS

| | | | |
|---|---|---|---|
| 3,407,337 | 10/1968 | Benham | 317—18 D |
| 3,544,844 | 12/1970 | Pellegrino | 317—16 |
| 3,287,603 | 11/1966 | Sosnoski | 340—255 |
| 3,213,321 | 10/1965 | Dalziel | 317—18 |

J D MILLER, Primary Examiner

H. FENDELMAN, Assistant Examiner

U.S. Cl. X.R.

317—27 R, 33 SC, 16, 47, 48